United States Patent
Dashti et al.

(10) Patent No.: US 9,559,802 B1
(45) Date of Patent: Jan. 31, 2017

(54) OPTICAL NETWORK REMOTE NODE FOR G-PON AND WDM-PON

(71) Applicant: Google Inc., Mountain View, CA (US)

(72) Inventors: Pedram Zare Dashti, Los Gatos, CA (US); Liang Du, San Jose, CA (US)

(73) Assignee: Google Inc., Mountain View, CA (US)

(*) Notice: Subject to any disclaimer, the term of this patent is extended or adjusted under 35 U.S.C. 154(b) by 24 days.

(21) Appl. No.: 14/501,347

(22) Filed: Sep. 30, 2014

(51) Int. Cl.
*H04J 14/00* (2006.01)
*H04J 14/02* (2006.01)
*H04B 10/27* (2013.01)
*H04B 10/25* (2013.01)

(52) U.S. Cl.
CPC ........... *H04J 14/0221* (2013.01); *H04B 10/25* (2013.01); *H04B 10/27* (2013.01)

(58) Field of Classification Search
None
See application file for complete search history.

(56) References Cited

U.S. PATENT DOCUMENTS

| 7,340,177 | B2 | 3/2008 | Kwon et al. | |
| 7,773,838 | B2 | 8/2010 | Lee et al. | |
| 2010/0054740 | A1* | 3/2010 | Lee | H04J 14/0226 398/68 |
| 2010/0322626 | A1* | 12/2010 | Kim | G02B 6/2937 398/63 |

FOREIGN PATENT DOCUMENTS

| EP | 1981196 A1 | 10/2008 |
| EP | 2482472 A2 | 8/2012 |

* cited by examiner

*Primary Examiner* — Ken N Vanderpuye
*Assistant Examiner* — David Lambert
(74) *Attorney, Agent, or Firm* — Honigman Miller Schwartz and Cohn LLP (57) ABSTRACT

An optical network node includes first and second node inputs receiving first and second multiplexed optical signals, respectively. The optical network node includes node outputs, each outputting a separate replicated or demultiplexed optical signal. The optical network node includes a first optical power splitter having a first splitter input connected to the first node input and first splitter outputs connected to the node outputs. The optical network node includes a second optical power splitter having a second splitter input connected to the second node input and second splitter outputs connected to the node outputs. The optical network node includes an arrayed waveguide grating having a grating input connected to the first node input and grating outputs connected to the node outputs, the arrayed waveguide grating demultiplexing the first multiplexed optical signal, when the first multiplexed optical signal is wavelength division multiplexed.

21 Claims, 8 Drawing Sheets

Prior Art

OPTICAL NETWORK REMOTE NODE FOR G-PON AND WDM-PON

TECHNICAL FIELD

This disclosure relates to optical networks and optical network remote nodes for passive optical network.

BACKGROUND

Figure 1A:
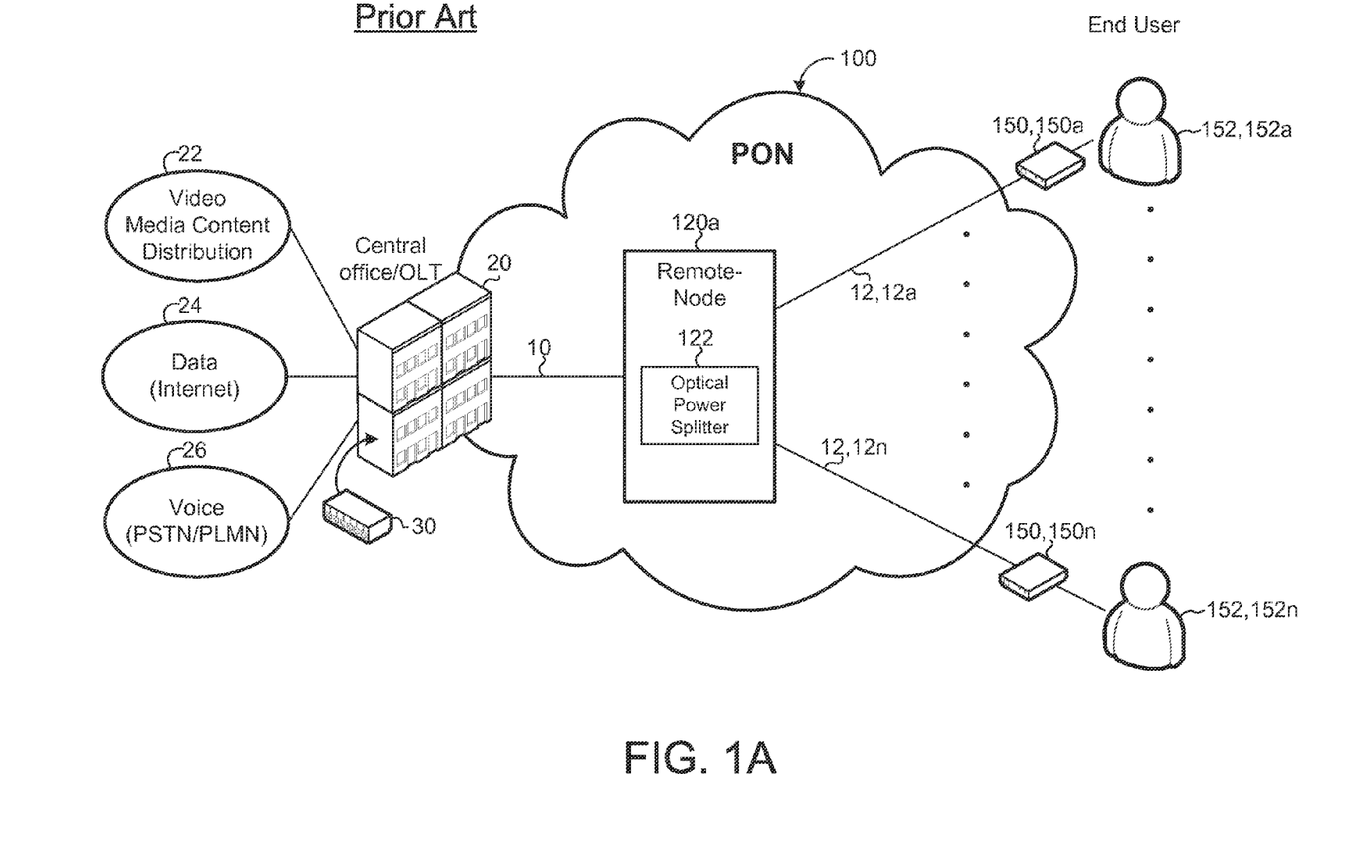
FIG. 1A is a schematic view of a TDM-PON network based on the prior art.
Figure 1B:
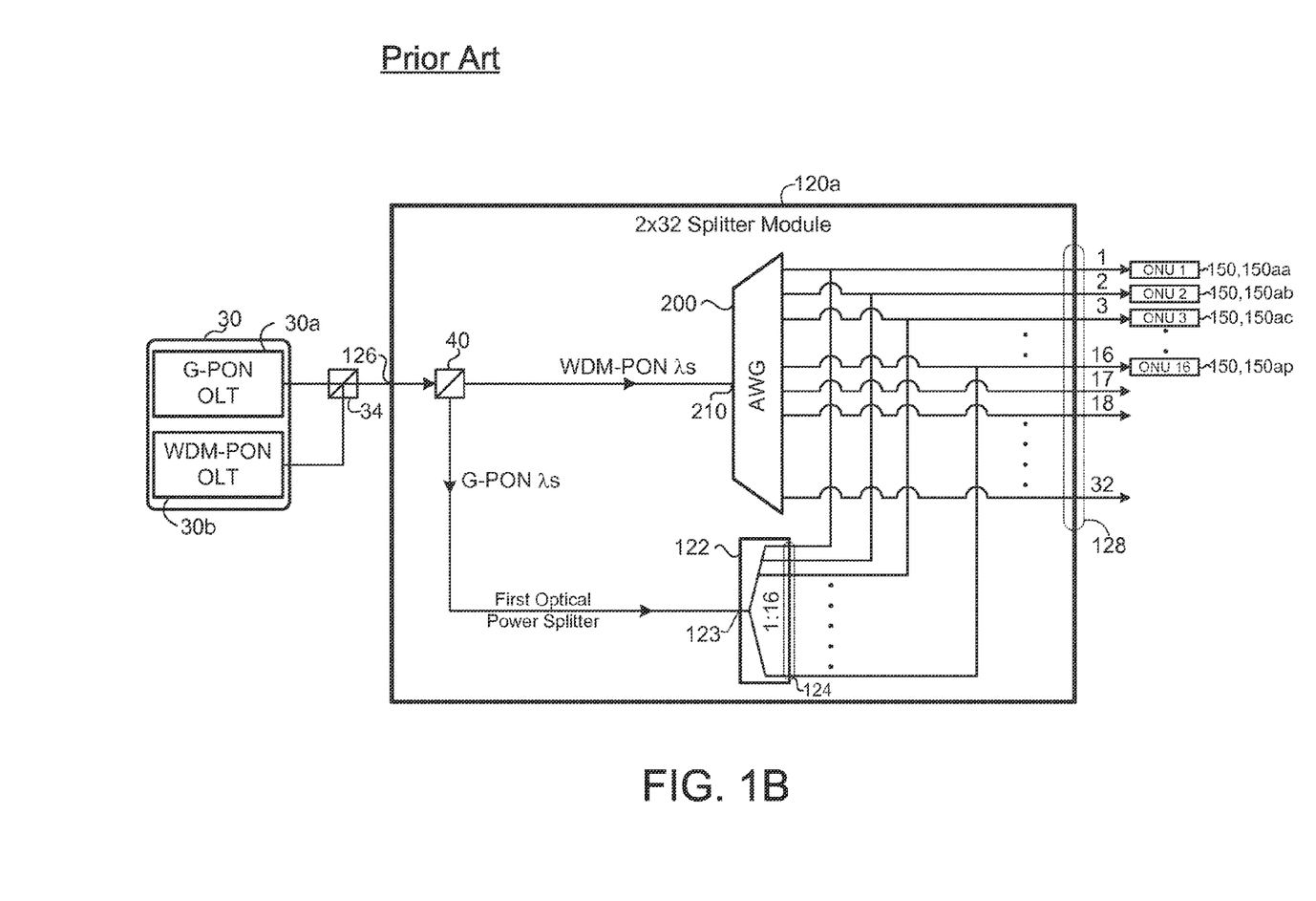
FIG. 1B is a schematic view of a TDM-PON network, using a 1:16 power splitter and an AWG, based on the prior art.

Fiber-to-the-home (FTTH) is the delivery of a communication signal through optical fiber from a central office (CO) or optical line terminal (OLT) to a home or a business of a user. Referring to FIGS. 1A and 1B, today's FTTH systems are mostly offered through point-to-multi-point time division multiplexed (TDM) passive optical networks 100 (PONs) using a passive optical power splitter 122 at a remote node 120a (RN) in the field to share a common transceiver 30 (OLT) at the CO 20, or through point-to-point (pt-2-pt) optical Ethernets (not shown), where a home-run fiber extends all the way back to a CO and each one is terminated by a separate transceiver as opposed to the shared transceiver 30 as shown. A PON 100 is a point-to-multipoint network architecture that uses optical power splitters 122 to enable a single optical feed fiber 10 to serve multiple users 150a-150n (e.g. 16-128). PON 100 provides optical signals from a CO 20 and includes an optical transmitter/receiver or transceiver 30 to a number of optical network terminals (ONUs) 150 that each includes a bidirectional optical transceiver.

Compared to pt-2-pt home run systems, a TDM-PON provides beneficial savings in the number of feeder fibers 10 (between a remote node 120a and the central office 20, and in the number of optical transceivers 30 at the CO 20 while saving patch panel space to terminate fibers. However, TDM-PON does not scale well with bandwidth growth. The bandwidth per household is often oversubscribed, since the bandwidth per optical line terminal transceiver at the central office 20 is shared among all ONUs 150 that are connected to an OLT 30.

Pt-2-pt systems provide the ultimate high bandwidth to end users 152; however, pt-2-pt uses a great number of both trunk fibers 10 and optical transceivers 30. Thus, pt-2-pt systems do not scale well with the OLT 30 at the CO 20 and the fiber count between the CO 20 and the RN 120a, resulting in greater space requirements, higher power, and an increased cost.

A properly implemented WDM-PON system provides CO 20 fiber termination consolidation that a TDM-PON system offers, bandwidth scalability similar to pt-2-pt home-run fiber systems and the easy-to-understand end-to-end Ethernet transparency. However, WDM-PON systems are still under development and to satisfy the short-term surge in bandwidth demand, carriers are deploying cost-effective TDM-PON systems, which have matured in technology. A non-disruptive migration strategy from TDM-PON to WDM-PON systems is therefore beneficial.

WDM-PON offers every broadband subscriber 152 a separate wavelength. It provides the benefits of both TDM-PON and pt-2-pt architectures. However, traditional WDM-PON systems are incompatible with TDM-PON systems. A WDM-PON network uses a wavelength demultiplexer as opposed to the power splitter used in TDM-PONs in the field to distribute optical signals to end-users.

Referring to FIG. 1B, one feeder fiber 10 is employed from the CO 20 to a remote node 122, where the signal is split by a splitter 122 (e.g., 1:16) and distributed to, for example, 16 optical network units 150aa-150ap. However, when upgrading from a G-PON to a WDM-PON system, legacy equipment may cause interference or non-use of certain equipment, such as some of the outputs of the remote node 120a.

SUMMARY

One aspect of the disclosure provides an optical network node including a first node input receiving a first multiplexed optical signal, a second node input receiving a second multiplexed optical signal, node outputs, a first optical power splitter, a second optical power splitter, and an arrayed waveguide grating. Each node output outputs a separate replicated or demultiplexed optical signal. The first optical power splitter has a first splitter input connected to the first node input and first splitter outputs connected to the node outputs. The first optical power splitter replicates the first multiplexed optical signal when the first multiplexed optical signal is time division multiplexed. The second optical power splitter has a second splitter input connected to the second node input and second splitter outputs connected to the node outputs. The second optical power splitter replicates the second multiplexed optical signal when the second multiplexed optical signal is time division multiplexed. The arrayed waveguide grating has a grating input connected to the first node input and grating outputs connected to the node outputs. The arrayed waveguide grating demultiplexes the first multiplexed optical signal when the first multiplexed optical signal is wavelength division multiplexed.

Implementations of the disclosure may include one or more of the following features. In some implementations, the node outputs include first and second groups of node outputs. The first splitter outputs are connected to the first group of node outputs and the second splitter outputs are connected to the second group of node outputs. In some examples, the grating outputs connect to the first and second groups of node outputs.

In some implementations, the first and second optical splitters have the same splitting ratio. Each of the first and second optical power splitters have a splitting output ratio equal to half of a demultiplexed ratio of an output of the arrayed waveguide grating. The arrayed waveguide grating demultiplexes an optical signal having M multiplexed signals, and the first and second optical power splitters have a splitting ratio of 1:M/2. The arrayed waveguide grating may demultiplex an optical signal having M multiplexed signals and has a multiplex ratio of 1:M.

Another aspect of the disclosure provides a method for accommodating a time division multiplexing optical signal and a wavelength division optical signal in a passive optical network. The method includes receiving multiplexed optical signals in one of a first node input and a second node input of an optical network node. The method further includes demultiplexing the received multiplexed optical signal by, when the received multiplexed optical signal includes a first time division multiplexed signal received at the first node input and a second time division multiplexed signal received at the second node input, optically splitting the first received signal using a first power optical splitter connected to the first node input and optically splitting the second received signal using a second power optical splitter connected to the second node input. The method further includes demultiplexing the received multiplexed optical signal using an arrayed waveguide grating having a grating input connected to the first node input. The method further includes outputting the demultiplexed optical signals through node outputs of the optical network node. The node outputs are connected to outputs of the first power optical splitter, the second power optical splitter, and the arrayed waveguide grating. Each node output carries a separate demultiplexed optical signal.

In some implementations, the node outputs include first and second groups of node outputs. The first power optical splitter has first splitter outputs connected to the first group of node outputs and the second power optical splitter has second splitter outputs connected to the second group of node outputs. Additionally or alternatively, the arrayed waveguide grating may have grating outputs connected to the first and second node output groups. The method further includes receiving a multiplexed signal from the first node input at the grating input, demultiplexing the wavelength division multiplexed optical signals in the arrayed waveguide grating, and outputting demultiplexed optical signals corresponding to the multiplexed signal at the first and second groups of node outputs.

The first and second optical splitters may have the same splitting ratio. Each of the first and second optical splitters may have a splitting ratio equal to half of a demultiplexed ratio of an output of the arrayed waveguide grating. The arrayed waveguide grating may demultiplex an optical signal having M multiplexed signals. The first and second optical power splitters may have a splitting ratio of 1:M/2. In some examples, the arrayed waveguide grating demultiplexers have an optical signal having M multiplexed signals and a multiplex ratio of 1:M. The first and second optical splitters may each have a demultiplexing ratio of 1:16, and the arrayed wave grating may have a demultiplexing ratio of 1:32.

Yet another aspect of the disclosure provides a method of upgrading a time division multiplexing passive optical network to a wavelength division multiplexing passive optical network. The method includes connecting a first optical fiber carrying a first multiplexed optical signal to a combiner, connecting a second optical fiber carrying a second multiplexed optical signal to the combiner, connecting the combiner to a first node input of an optical network node, and connecting a third optical fiber carrying a third multiplexed optical signal to a second node input of the optical network node. The optical network node includes node outputs, a first optical power splitter having a first splitter input connected to the first node input and first splitter outputs connected to the node outputs, a second optical power splitter having a second splitter input connected to the second node input and second splitter outputs connected to the node outputs, and an arrayed waveguide grating having a grating input connected to the first node input and grating outputs connected to the node outputs. The first optical splitter replicates the first multiplexed optical signal when the first multiplexed optical signal is time division multiplexed. The second optical power splitter replicates the second multiplexed optical signal when the second multiplexed optical signal is time division multiplexed. The arrayed waveguide grating demultiplexes the first multiplexed optical signal when the first multiplexed optical signal is wavelength division multiplexed.

In some implementations, the node outputs include first and second groups of node outputs. The first power splitter has first splitter outputs connected to the first group of node outputs and the second power optical splitter has second splitter outputs connected to the second group of node outputs. The arrayed waveguide grating may have grating outputs connecting to the first and second node output groups.

The first and second optical power splitters may have the same splitting ratio. In some examples, each of the first and second optical power splitters have a splitting ratio equal to half of a demultiplexed ratio of an output of the arrayed waveguide grating. The arrayed waveguide grating may demultiplex an optical signal having M multiplexed signals, and the first and second optical power splitters may have a splitting ratio of 1:M/2. In some examples, the arrayed waveguide grating demultiplexes an optical signal having M multiplexed signals and a multiplex ratio of 1:M. The first and second optical splitters may each have a demultiplexing ratio of 1:16. The arrayed wave grating may have a demultiplexing ratio of 1:32.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Fiber to the home (FTTH) is regarded as the end state of broadband access networks as fiber offers virtually unlimited bandwidth. FTTH replaces currently used copper infrastructure (e.g., telephone wires, coaxial cable, etc.). Multiplexing is a method used in optical networks to utilize the large bandwidth of optics to their full benefits. Multiplexing enables several virtual channels to be formed on a single fiber. Therefore, multiplexing several optical signals increases the utility of a network infrastructure. Time division multiplexing (TDM) is a method used to multiplex several signals onto one high-speed digital fiber optic link. TDM multiplexes several signals by establishing different virtual channels using different time slots. Wavelength division multiplexing (WDM) multiplexes the signals by having different virtual channels use different wavelengths.

Figure 2A:
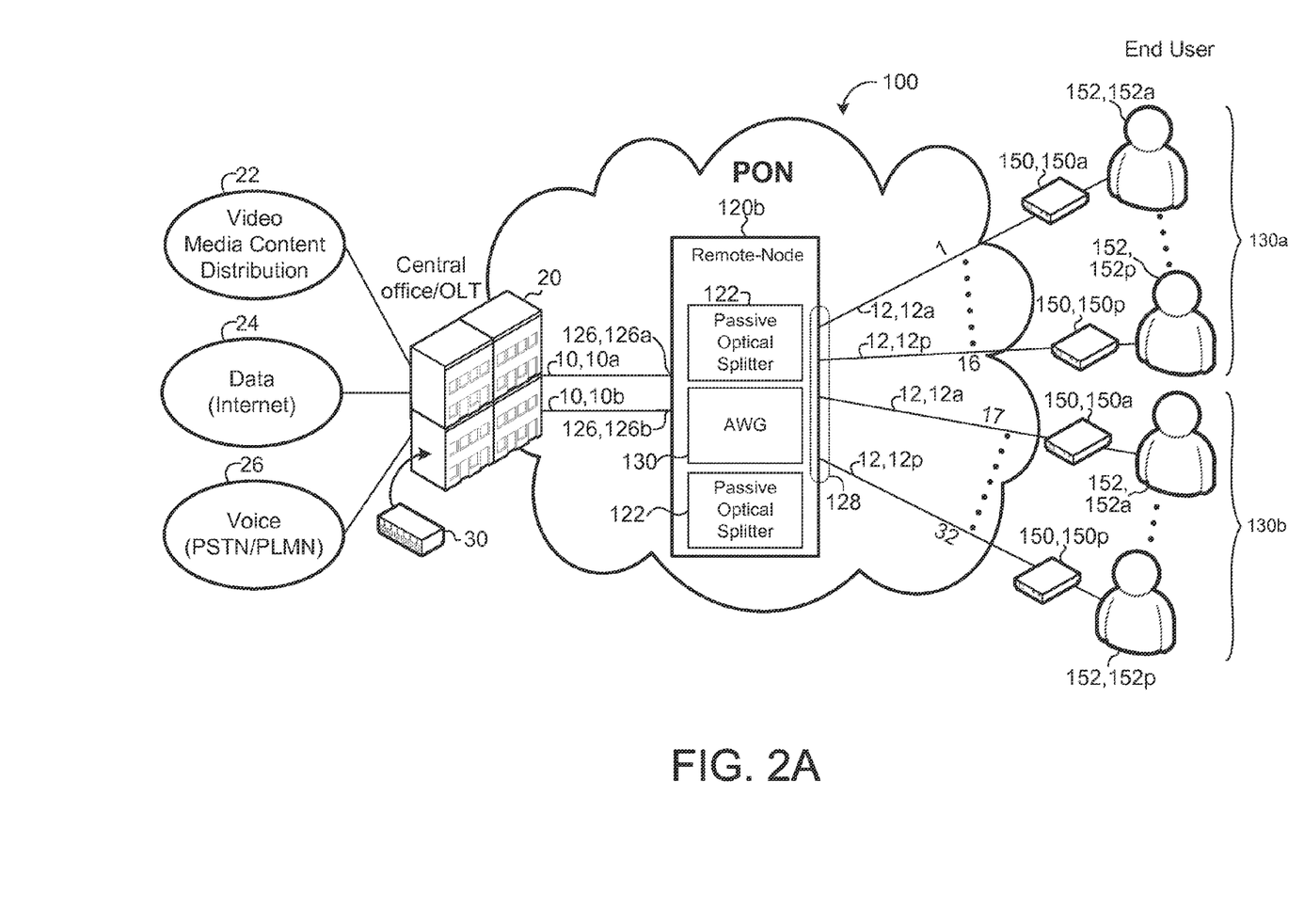
FIG. 2A is a schematic view of an exemplary WDM/TDM-PON network.

Referring to FIG. 2A, commercial FTTH systems are mostly implemented with TDM (time division multiplexed) PON (passive optical network) technologies. A TDM-PON shares a single OLT (Optical Line Terminal) transceiver 30 at the CO 20 (Central Office) with multiple end customers 152 using a power splitter 122. The central office 20 receives information, such as video media distribution 22, internet data 24, and voice data 26 that may be transferred to the end users 152. The CO 20 includes an optical line terminal 30 (OLT) connecting the optical access network to an IP, ATM, or SONET backbone. Therefore, the OLT 30 device is the endpoint of the PON 100 and converts the electrical signals used by a service provider's equipment and the fiber optic signals used by the PON 100. In addition, the OLT 30 coordinates multiplexing between the conversion devices at the user end 152. The OLT 30 sends the fiber optic signal through a feeder fiber 10*a*, and the signal is received by a remote optical distribution node 120*b*, which splits or demultiplexes the optical signal and distributes it to multiple users 152. The remote node 120*b* includes two passive optical power splitters 122 and an arrayed waveguide 130.

The most commonly deployed TDM-PON systems are the GPON system standardized by ITU (International Telecommunication Union) and the EPON system standardized by IEEE (Institute of Electrical and Electronics Engineers). We use GPON to represent TDM-PON system in this description, but EPON systems operate in very similar fashion, especially on the optical layer. A GPON system offers 2.5 Gb/s downstream bandwidth and 1.25 Gb/s upstream bandwidths, shared on the feeder fiber 10 among the users 152, and connected to the same OLT transceiver 30. GPON systems are mature and very cost effective. TDM PON faces difficulty in bandwidth scaling as the optical transceivers 30 at both the OLT 20 and the ONU 150 ends need to operate at the aggregate bandwidth of all of the ONUs sharing the same OLT. TDM-PONs may have a 1:16 power splitting ratio. The bandwidth reach and the per user average bandwidth scales inversely with respect to the splitting ratio.

Rapidly increasing internet applications are straining the bandwidth available from legacy TDM PON systems. For example, on a fully loaded GPON system with 1:16 splitting ratio, the average downstream bandwidth per user is about 76 Mb/s. One way to increase the average bandwidth per user is to deploy the next generation TDM-PON systems, for example, using NG-PON with 10 Gb/s downstream datarate. However, these systems are still in development and are very expensive cost-wise. Another way to increase the average bandwidth per user is to reduce the share group size, for example, using 1:16 splitting ratio (as shown in FIG. 2). Compared to 1:32 splitting ratio design, this would double the average bandwidth per user at the cost of doubling the number of feeder fibers 10 and OLT 30 port counts, while keeping the same mature and low-cost legacy GPON equipment. This solution temporarily solves the increase demands for bandwidth. As time goes by, the demands for bandwidth from individual users 152 will keep increasing and the number of users will also increase as take rate increases. To overcome the long term increase in bandwidth demand, a migration to WDM-PON with higher ONU count per feeder fiber 10 is evident to be able to accommodate the increase in bandwidth demand and take rate.

Figure 2B:
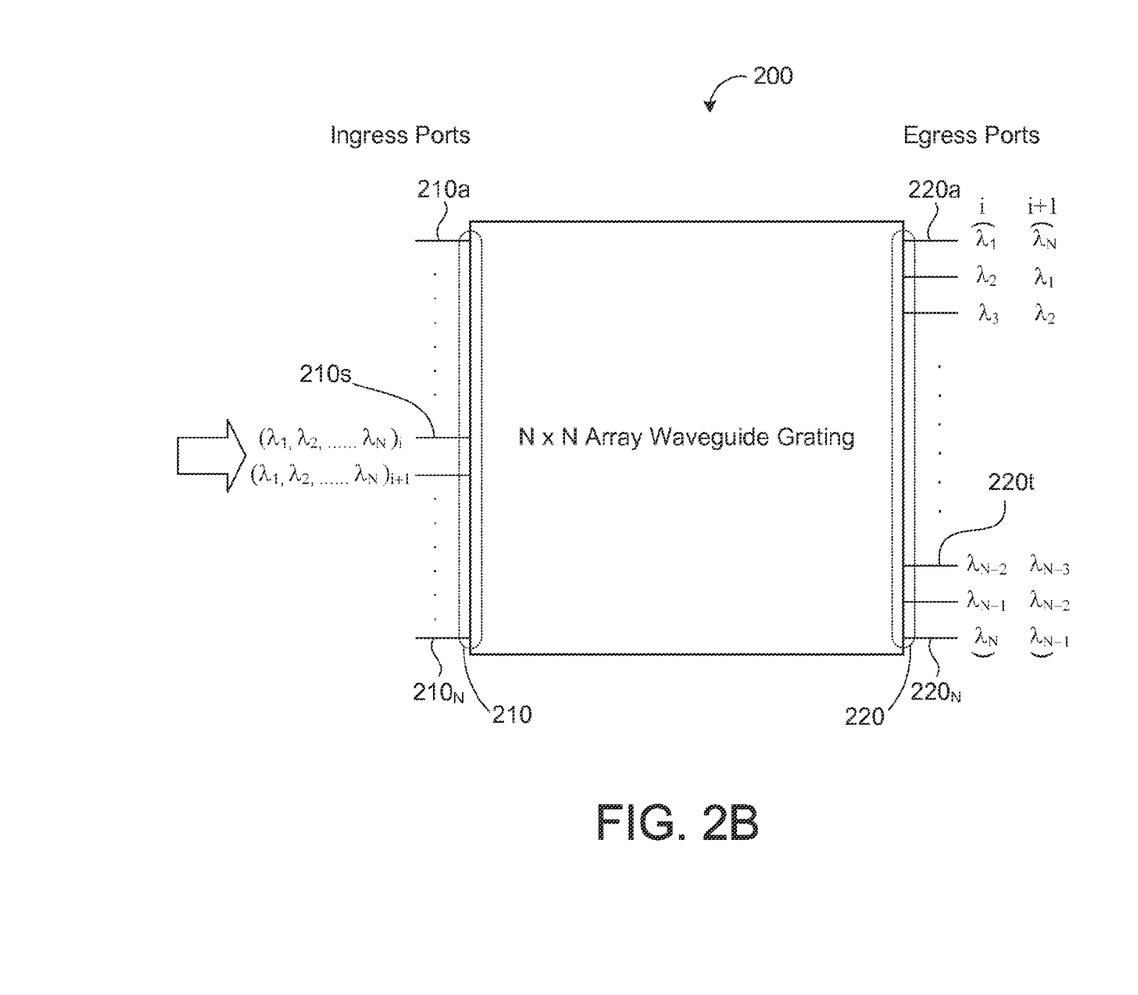
FIG. 2B is a schematic view of an AWG used in the exemplary WDM/TDM-PON network of FIG. 2A.
Figure 2C:
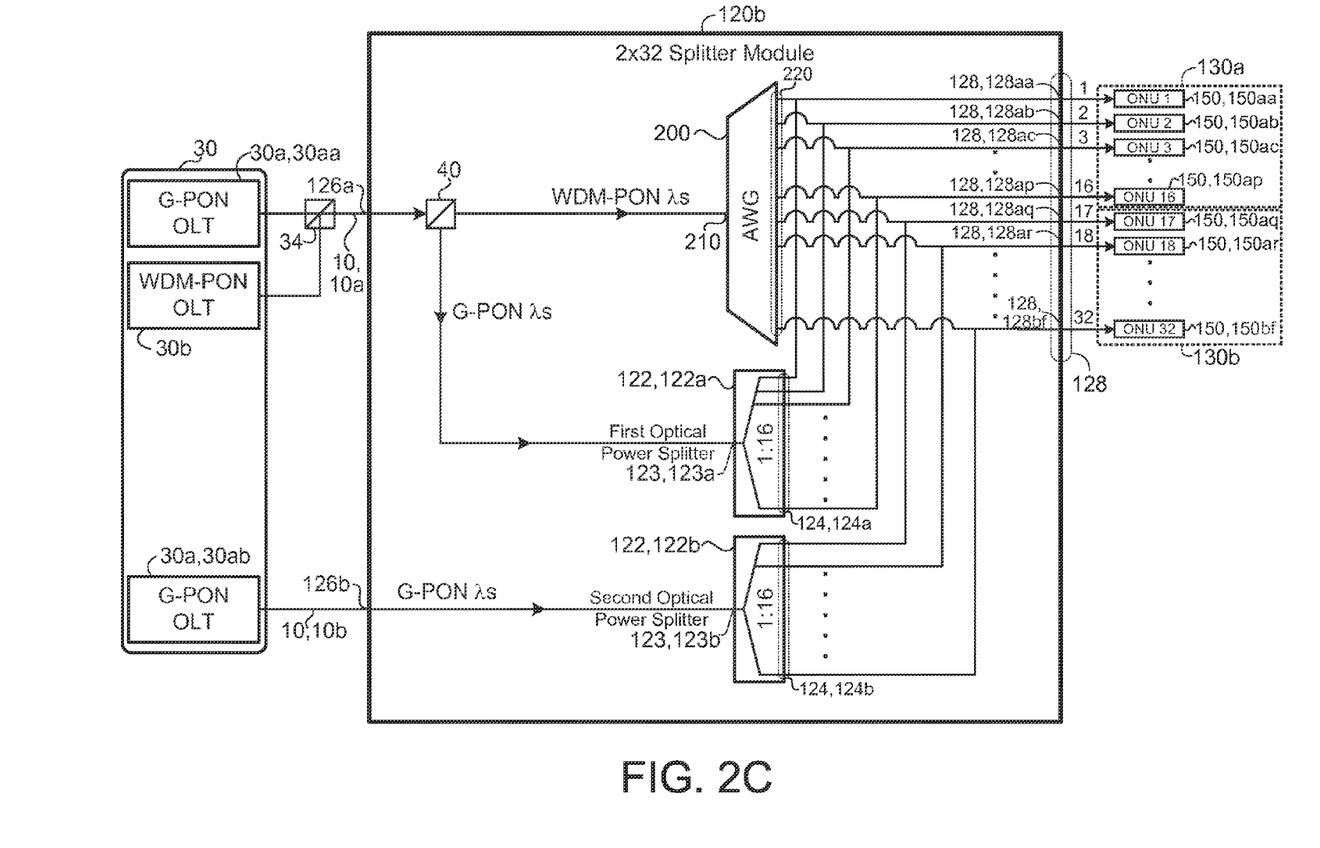
FIG. 2C is a schematic views of an exemplary WDM/TDM-PON network.

Referring to FIG. 2A-2C, in some implementations an optical network remote node 120*b* includes first and second node inputs 126*a*, 126*b*, node outputs 128, 128*a*-*n* (e.g., outputs having 1-32), first and second optical power splitters 122*a*, 122*b*, and an arrayed waveguide grating 200 (AWG also abbreviated as WGR). The optical power splitters 122 splits TDM-PON signals received from the CO 20, and the AWG 200 demultiplexes WDM-PON signals received from the CO 20 according to wavelengths. The remote node 120*b* includes an optical filter 40 connected to the first node input 126*a*. The optical filter 40 directs TDM-PON signals to the first splitter 122*a* and WDM-PON to the AWG 200. This allows for a seamless upgrade of the network 10 from a TDM-PON to a WDM-PON. The first and second node inputs 126*a*, 126*b* each receive a multiplexed optical signal via an optical fiber 10, and each node output 128, 128*a*-*n* (e.g., outputs 1-32) outputs a separate demultiplexed optical signal through optical fibers 12 connecting the optical network remote node 120*b* to the optical network unit 150 (ONU) of an end user 152.

Referring back to FIG. 1B, previously the remote node 120*a* includes a 1:16 splitter 122 and an AWG 200 (e.g., 1:32) both connecting to an input node 126 and outputs 128. When the CO 20 (e.g., G-PON OLT 30*a*) sends the remote node 120*a* a time division multiplexed signal, the optical power splitter 122 splits the received optical signal and broadcasts the split signals at the node outputs 128*a*-*n* (e.g., outputs 1-16). The remote node 120*a* includes 32 outputs to accommodate for the wavelength division multiplexed signal when the WDM-PON system is upgraded. However, since the remote node 120*a* includes a 1:16 splitter 122, then the remote node 120*a* utilizes 16 outputs due to the splitter 122 limitations (i.e., 16 outputs). Therefore, when upgrading from a TDM-PON to a WDM-PON system, legacy equipment may cause interference or non-use of certain equipment, such as the outputs 17-32 of the remote node 120*a*. Therefore, it is desirable to provide a remote node 120*b* (FIGS. 2A-2C) that utilizes all of the outputs 128, allowing the remote node 120*b* to have twice the utilization of its outputs 128 before upgrading to the WDM-PON.

Referring back to FIGS. 2A-2C, the remote node 120*b* includes a 2 by 32 splitter module (using two 1:16 splitters 122*a*, 122*b* and an AWG 200) that facilitates conversion from a TDM-PON to WDM-PON without having unused output ports 128 on the remote node 120*b*. Each optical power splitter 122 has a splitter input 123 connected to one of the node inputs 126*a*, 126*b* and splitter outputs 124 connected to corresponding node outputs 128, 128*a*-*n* (e.g., outputs 1-32). The arrayed waveguide grating 200 has a grating input 210 connected to the first node input 126*a*. In addition, the arrayed waveguide grating 200 has outputs 220 (e.g., outputs 1-32) connected to the corresponding node outputs 128*aa*-*bf* (e.g., outputs 1-32). The outputs 124*a* of the first splitter 122*a* are connected to a first group 130*a* of node outputs 128 (e.g., output nodes 1-16 128*aa*-128*ap*) and the outputs 124*b* of the second splitter 122*b* are connected to a second group 130*b* of node outputs 128 (e.g., output nodes 17-32 128*ar*-128*bf*). If the multiplexed optical signal received at one or both of the node inputs 126*a*, 126*b* is time division multiplexed, the corresponding connected optical power splitter 122*a*, 122*b* splits the received optical signal and broadcasts the split signals at the node outputs 128*aa*-*af* (e.g., outputs 1-32), where the first splitter 122*a* broadcasts the split signal that was received at the first node input 126*a* and outputs the split signal at the first group 130*a* of node outputs 128 (e.g., nodes 1-16), and the second splitter 122*b* broadcasts the split signal that was received at the second node input 126*b* and outputs the split signal at the second group 130*b* of node outputs 128 (e.g., nodes 17-32). Additionally, if the optical signal received at the first node inputs 126*a* is wavelength division multiplexed, the arrayed waveguide grating 200 demultiplexes the received optical signals by wavelengths and outputs the demultiplexed signals at the node outputs 128*aa*-*bf* (e.g., outputs 1-32).

As bandwidth demand is increasing, users 152 can gradually and seamlessly migrate to WDM-PON using the 2:32 remote node 120*b* by introducing WDM-PON OLTs 30*b* at the CO 20 and WDM-PON capable ONUs 150 at the user 152 side. The remote node 120*b* allows carriers to deploy a TDM-PON system with a splitting ratio (2:32), and later seamlessly upgrade to a WDM-PON with splitting ratio (1:32) as demand from single user bandwidth increases and the take rate increases to demand higher-efficiency fiber distribution networks. Since the AWG wavelength splitter 200 does not have the inherent power splitter splitting loss, which increases with the splitting ratio, WDM-PON links are also more scalable than links in TDM-PON systems. Additionally, the optical node 120*b* consolidates the terminal at the CO 20 by sharing a single OLT transceiver 30 with multiple ONUs 150 and therefore minimizing the termination complexity.

FIG. 2B illustrates an exemplary arrayed waveguide grating 200 (AWG). An AWG 200 is commonly used to demultiplex an optical signal in a wavelength division multiplexed system. AWGs 200 can multiplex a large number of wavelengths into one optical fiber, thus increasing the transmission capacity of optical networks. AWGs can therefore multiplex channels of several wavelengths onto a single optical fiber at a transmission end, and reciprocally they can also demultiplex one single channel having different wavelengths at the receiving end of an optical communication network. An AWG 200 is a passive planar light wave circuit device typically used in optical networks as a wavelength multiplexer and/or demultiplexer. N×N AWGs 200 also have wavelength routing capabilities. If a system has N equally-spaced wavelengths $\lambda_N$, an N×N AWG 200 can be designed with an egress port spacing matching the wavelength spacing. The N×N AWG 200 routes differing wavelengths at an ingress port 210 to different egress ports 220 such that all N wavelengths are mapped to all N egress ports $220_N$ sequentially. The routing of the same N wavelengths at two consecutive ingress ports 210 have the wavelength mapping shifted by one egress side, which is noted as cyclic. In some implementations, the AWG 200 receives a first multiplexed optical signal at a first input 210*a* (e.g., input 1) via a first optical fiber 10*a*. The AWG 200 demultiplexes the received signal and outputs demultiplexed signals through its outputs 220, 220*a-n* (e.g., outputs 1-32).

Referring to FIG. 2C, in some implementations, a remote distribution node 120*b* includes one 1:M (e.g., 1:32) AWG splitter 200 and two 1:(M/2) (e.g., 1:16) power splitters 122*a*. 122*b*, and acts a hybrid splitter (combining two power splitters 122 and an AWG 200) allowing for smooth upgrade from TDM-PON to WDM-PON. The remote node 120*b* contains a first 1:M/2 power splitter 122*a*, a second 1:M/2 power splitter 122*b* and an AWG 200 splitter (1:32), which splits wavelengths as opposed to power. The total number of output ports of the two TDM power splitters and the number of WDM demultiplexed channels are the same (e.g., both equal to 32). The first and second optical power splitters 122*a*, 122*b* may have the same splitting ratio. In some examples, the first and second optical power splitters 122*a*, 122*b* have a splitting ratio equal to half of an output demultiplexing ratio of the AWG 200. Thus, the demultiplexing ratio of the AWG 200 may be equal to the output sum of the splitting ratio of the optical power splitters 22*a*, 122*b*. In some examples, the AWG 200 receives a multiplexed optical signal from its input 210. The AWG 200 may demultiplex an optical signal having M multiplexed signals (e.g., 32 multiplexed signals). As an example, when the AWG input 210 receives a signal having wavelengths $\lambda 1$ through $\lambda 32$, the AWG 200 outputs 32 separate signals at corresponding separate outputs 220 (e.g., output 1 through output 32).

In some implementations, when the network is updated from the TDM-PON to WDM-PON systems, which has better bandwidth scalability, the CO 20 transmits a signal from the WDM OLT 30*b*. During a TDM transmission, the CO 20 transmits a first signal from a first TDM OLT 30*aa* received by the first input port 126*a* of the remote node 120*b* and a second TDM OLT 30*ab* received by the second input port 126*b* of the remote node 120*b*. As shown, when the OLT 30 sends a WDM optical signal, the remote node 120*b* demultiplexes the signal using the AWG 200, and when the OLT sends a TDM signal, the remote node 120*b* replicates the signal using the power splitter 122*b*. In some examples, the CO 20 includes a central office optical filter 34 filtering a received signal from the central node 120*b* and transmitting the signal to the TDM-OLT 30*aa* when the received signal is a TDM signal, and transmitting the signal to the WDM-PON OLT 30*b* when the signal is a WDM signal.

Following the operating principle of the AWG 200, if the AWG 200 receives a multiplexed signal at a grating input 210 having wavelengths $\lambda 1$ through $\lambda 32$, the AWG 200 demultiplexes the multiplexed signal and outputs the demultiplexed signals from the grating outputs 220 (e.g., output 1-32, 128*aa*-128*bf*).

As described with reference to FIG. 2C, the AWG 200 includes 32 outputs; therefore two TDM-PON OLTs 30*aa*, 30*ab* are connected to the splitter module 120*b*. However, the AWG 200 may include a greater number of outputs and can support more than two TDM-PON OLTs 30. For example, the AWG 200 may include 48 outputs and supports three TDM-PON OLTs 30. Other examples are also available.

Figure 3:
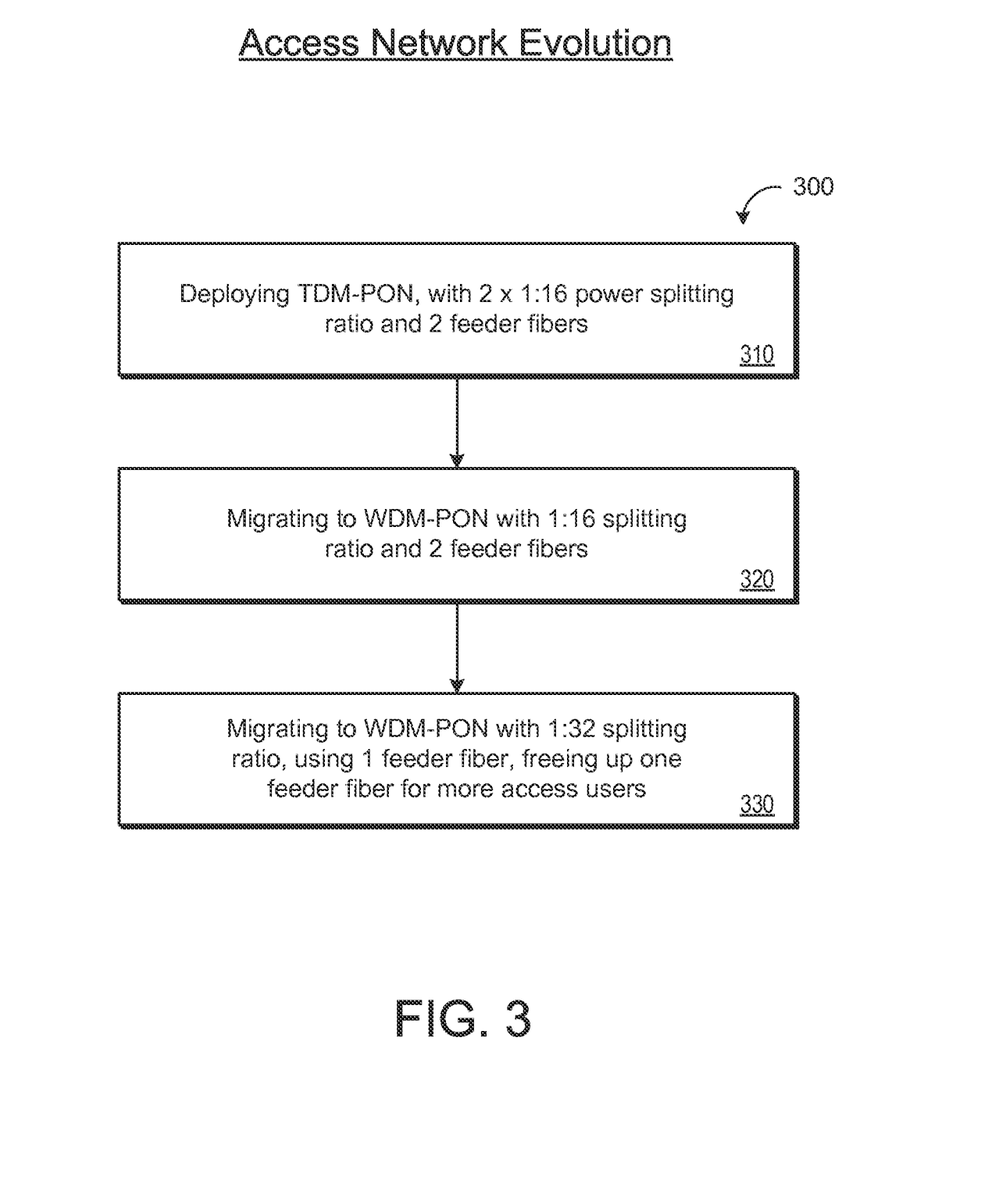
FIG. 3 is a flow chart of the network evolution.

Referring to FIG. 3, the hybrid remote node 120*b* described above remains constant as fiber optic networks evolve and the demand for more bandwidth is requested per user. The node 120*b* adapts to the evolution to deployment of TDM-PON, with 2:32 power splitting ratio and two feeder fibers 10*a*, 10*b* used for TDM and one feeder fiber used after the WDM-PON is deployed. Following, the node 120*b* adapts to the migration of the WDM-PON with a 1:32 splitting ratio, using one feeder fiber 10*a* and a 1:32 AWG 200 and freeing up the second feeder 10*b* for more access users 152. Therefore, the remote node 120*b* adjusts to the fast increasing demand by the users 152 in bandwidth.

Figure 4:
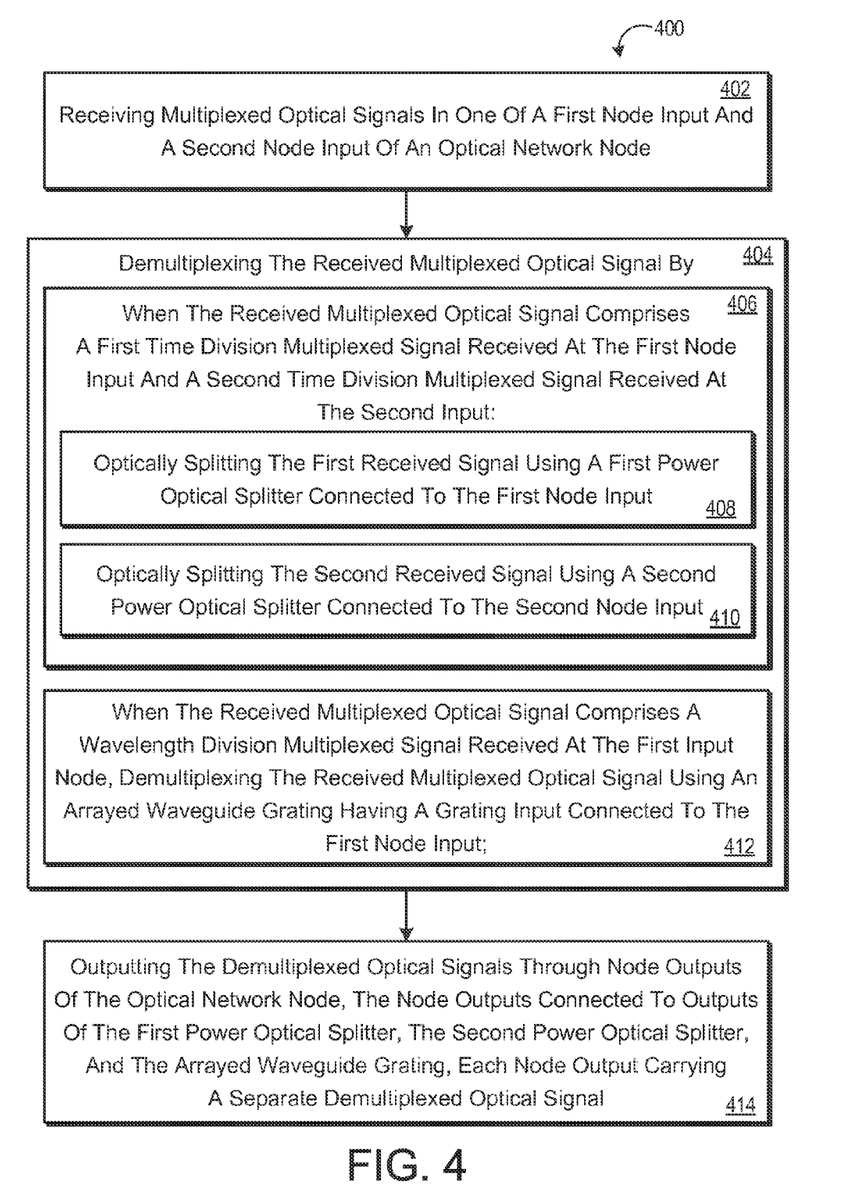
FIG. 4 is a schematic view of an exemplary arrangement of operations for accommodating a TDM and a WDM in a PON.

FIG. 4 illustrates a method 400 for accommodating a time division multiplexing optical signal and a wavelength division optical signal in a passive optical network 100. The method 400 includes receiving 402 multiplexed optical signals in one of a first node input 126*a* and a second node input 126*b* of an optical network node 120*b*. The method 400 further includes demultiplexing 404 the received multiplexed optical signal by, when 406 the received multiplexed optical signal includes a first time division multiplexed signal received at the first node input 126*a* and a second time division multiplexed signal received at the second node input 126*b*, optically splitting 408 the first received signal using a first power optical splitter 122*a* connected to the first node input 126*a* and optically splitting 410 the second received signal using a second power optical splitter 122*b* connected to the second node input 126*b*. The method 400 further includes demultiplexing 412 the received multiplexed optical signal using an arrayed waveguide grating 200 having a grating input connected to the first node input 126*a*. The method 400 further includes outputting 414 the demultiplexed optical signals through node outputs of the optical network node 120*b*. The node outputs are connected to outputs of the first power optical splitter 122*a*, the second power optical splitter 122*b*, and the arrayed waveguide grating 200. Each node output 128 carries a separate demultiplexed optical signal.

In some implementations, the node outputs 126 include first and second groups 130*a*, 130*b* of node outputs 128*a*, 128*b*. The first power optical splitter 122*a* has first splitter outputs 124*a* connected to the first group 130*a* of node outputs 128 and the second power optical splitter 122*b* has second splitter outputs 124*a* connected to the second group 130*b* of node outputs 128. Additionally or alternatively, the arrayed waveguide grating 200 may have grating outputs connected to the first and second node output groups 130*a*, 128*b*. The method 400 further includes receiving a multiplexed signal from the first node input 126*a* at the grating input 210, demultiplexing the wavelength division multiplexed optical signals in the arrayed waveguide grating 200, and outputting demultiplexed optical signals corresponding to the multiplexed signal at the first and second groups 130*a*, 130*b* of node outputs 128.

The first and second optical splitters 122*a*, 122*b* may have the same splitting ratio (e.g., 1:16). Each of the first and second optical splitters 122*a*, 122*b* may have a splitting ratio equal to half of a demultiplexed ratio of an output of the arrayed waveguide grating 200. The arrayed waveguide grating 200 may demultiplex an optical signal having M multiplexed signals. The first and second optical power splitters 122*a*, 122*b* may have a splitting ratio of 1:M/2. In some examples, the arrayed waveguide grating 200 demultiplexers have an optical signal having M multiplexed signals and a multiplex ratio of 1:M. The first and second optical splitters 122*a*, 122*b* may each have a demultiplexing ratio of 1:16, and the arrayed wave grating 200 may have a demultiplexing ratio of 1:32.

Figure 5:
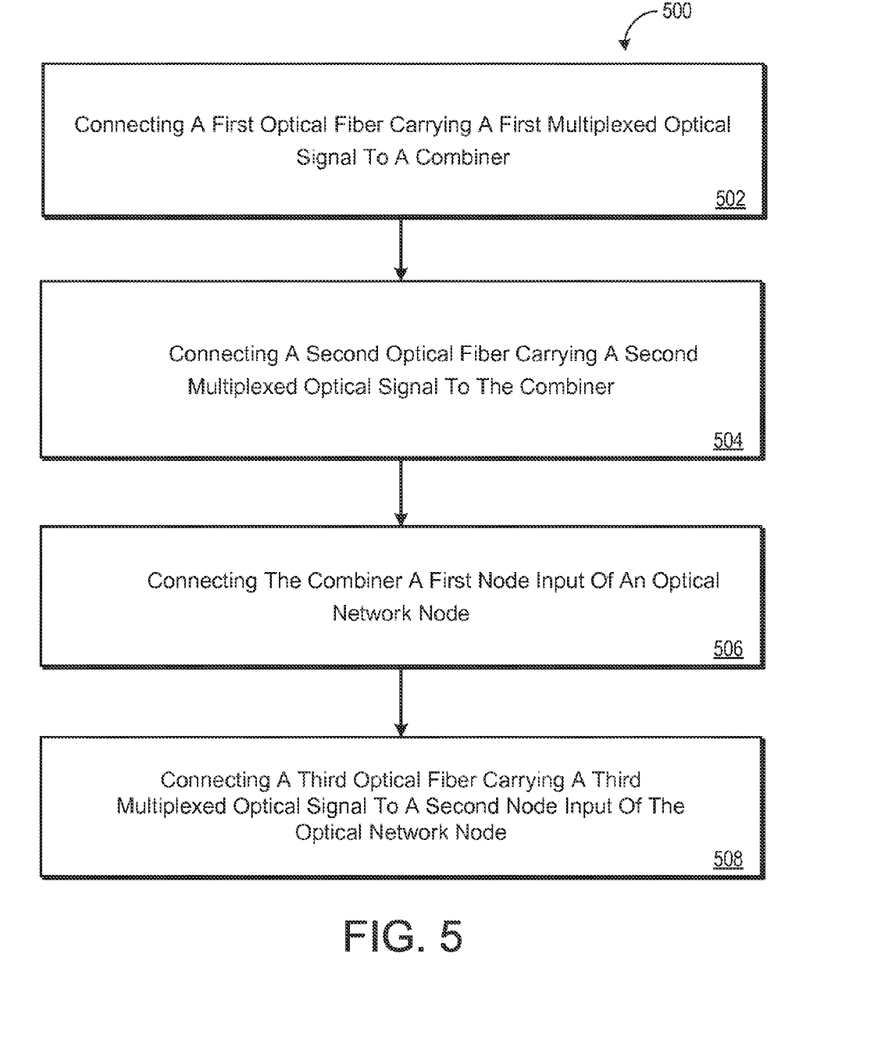
FIG. 5 is a schematic view of an exemplary arrangement of operations for upgrading a time division multiplexing passive optical network to a wavelength division multiplexing passive optical network.

FIG. 5 illustrates a method 500 of upgrading a time division multiplexing passive optical network to a wavelength division multiplexing passive optical network. The method 500 includes connecting 502 a first optical fiber carrying a first multiplexed optical signal to a combiner 34, connecting 504 a second optical fiber carrying a second multiplexed optical signal to the combiner 34, connecting 506 the combiner to a first node input 126*a* of an optical network node 120*b* (via a fiber feeder 10*a*), and connecting 508 a third optical fiber 10*d* carrying a third multiplexed optical signal to a second node input 126*b* of the optical network node 120*b*. The optical network node 120*b* includes node outputs 128, a first optical power splitter 122*a* having a first splitter input 123*a* connected to the first node input 126*a* and first splitter outputs 124*a* connected to the node outputs 128, a second optical power splitter 122*b* having a second splitter input 123*b* connected to the second node input 126*b* and second splitter outputs 124*b* connected to the node outputs 128, and an arrayed waveguide grating 200 having a grating input 210 connected to the first node input 126*a* and grating outputs 220 connected to the node outputs 128. The first optical splitter 122*a* replicates the first multiplexed optical signal when the first multiplexed optical signal is time division multiplexed. The second optical power splitter 122*b* replicates the third multiplexed optical signal when the third multiplexed optical signal is time division multiplexed. The arrayed waveguide grating 200 demultiplexes the second multiplexed optical signal when the second multiplexed optical signal is wavelength division multiplexed.

In some implementations, the node outputs 128 include first and second groups 130*a*, 130*b* of node outputs 128. The first power splitter 122*a* has first splitter outputs 124*a* connected to the first group 130*a* of node outputs 128 and the second power optical splitter 122*b* has second splitter outputs 124*b* connected to the second group 130*b* of node outputs 128. The arrayed waveguide grating 200 may have grating outputs 220 connecting to the first and second node output groups 130*a*, 130*b*.

The first and second optical power splitters 122*a*, 122*b* may have the same splitting ratio (e.g., 1:16). In some examples, each of the first and second optical power splitters 122*a*, 122*b* have a splitting ratio equal to half of a demultiplexed ratio of an output 210 of the arrayed waveguide grating 200. The arrayed waveguide grating 200 may demultiplex an optical signal having M multiplexed signals, and the first and second optical power splitters 122*a*, 122*b* may have a splitting ratio of 1:M/2. In some examples, the arrayed waveguide grating 200 demultiplexes an optical signal having M multiplexed signals and a multiplex ratio of 1:M. The first and second optical splitters 122*a*, 122*b* may each have a demultiplexing ratio of 1:16. The arrayed wave grating 200 may have a demultiplexing ratio of 1:32.

A number of implementations have been described. Nevertheless, it will be understood that various modifications may be made without departing from the spirit and scope of the disclosure. Accordingly, other implementations are within the scope of the following claims.

What is claimed is:

1. An optical network node comprising:
   a first node input configured to receive a first multiplexed optical signal being time division multiplexed at a first time or wavelength division multiplexed at a second time different than the first time;
   a second node input configured to receive a second multiplexed optical signal;
   node outputs, each configured to output a separate replicated or demultiplexed optical signal, the node outputs comprising first and second groups of node outputs;
   an optical filter optically coupled to the first node input;
   a first optical power splitter having a first splitter input and first splitter outputs, the first splitter input connected to the optical filter, the optical filter configured to filter time division multiplexed signals to the first optical power splitter, the first splitter outputs directly coupled to the first group of node outputs, the first optical power splitter replicating the first multiplexed optical signal, when the first multiplexed optical signal is time division multiplexed;
   a second optical power splitter having a second splitter input connected to the second node input and second splitter outputs directly coupled to the second group of node outputs, the second optical power splitter replicating the second multiplexed optical signal, when the second multiplexed optical signal is time division multiplexed; and
   an arrayed waveguide grating having a grating input and grating outputs, the grating input connected to the optical filter, the optical filter configured to filter wavelength division multiplexed signals to the arrayed waveguide grating, the grating outputs directly coupled to the first and second groups of node outputs, the arrayed waveguide grating demultiplexing the first multiplexed optical signal, when the first multiplexed optical signal is wavelength division multiplexed.

2. The optical network node of claim 1, wherein the arrayed waveguide grating:
   receives the first multiplexed optical signal from the first node input at its grating input;
   demultiplexes the first multiplexed signal; and
   outputs demultiplexed first optical signals at the grating outputs.

3. The optical network node of claim 1, wherein the first and second optical splitters have the same splitting ratio.

4. The optical network node of claim 1, wherein each of the first and second optical power splitters has a splitting output ratio equal to half of a demultiplexed ratio of an output of the arrayed waveguide grating.

5. The optical network node of claim 1, wherein the arrayed waveguide grating demultiplexes an optical signal having M multiplexed signals, and the first and second optical power splitters have a splitting ratio of 1:M/2.

6. The optical network node of claim 1, wherein the arrayed waveguide grating demultiplexes an optical signal having M multiplexed signals and has a multiplex ratio of 1:M.

7. A method for accommodating a time division multiplexing optical signal and a wavelength division optical signal in a passive optical network, the method comprising:
receiving multiplexed optical signals in one of a first node input and a second node input of an optical network node, the received multiplexed optical signals at the first node being time division multiplexed at a first time or wavelength division multiplexed at a second time different than the first time;
demultiplexing at least one received multiplexed optical signal by:
when the at least one received multiplexed optical signal received at the first time comprises a first time division multiplexed signal received at the first node input and a second time division multiplexed signal received at the second node input:
optically splitting the first received signal using a first power optical splitter connected to the first node input; and
optically splitting the second received signal using a second power optical splitter connected to the second node input; and
when the at least one received multiplexed optical signal received at the second time comprises a wavelength division multiplexed signal received at the first input node, demultiplexing the at least one received multiplexed optical signal using an arrayed waveguide grating having a grating input connected to the first node input; and
outputting the at least one demultiplexed optical signal through node outputs of the optical network node, the node outputs comprising first and second groups of node outputs, the first group of node outputs directly coupled to outputs of the first power optical splitter and outputs of the arrayed waveguide grating, the second group of node outputs directly coupled to outputs of the second power optical splitter and outputs of the arrayed waveguide grating, each node output of the first and second groups of node outputs carrying a separate demultiplexed optical signal.

8. The method of claim 7, further comprising:
receiving a wavelength division multiplexed signal from the first node input at the grating input;
demultiplexing the wavelength division multiplexed optical signal in the arrayed waveguide grating; and
outputting demultiplexed optical signals corresponding to the wavelength division multiplexed signal at the first and second groups of node outputs.

9. The method of claim 7, wherein the first and second optical power splitters have the same splitting ratio.

10. The method of claim 7, wherein each of the first and second optical power splitters has a splitting ratio equal to half of a demultiplexed ratio of an output of the arrayed waveguide grating.

11. The method of claim 7, wherein the arrayed waveguide grating demultiplexes an optical signal having M multiplexed signals, and the first and second optical power splitters have a splitting ratio of 1:M/2.

12. The method of claim 7, wherein the arrayed waveguide grating demultiplexes an optical signal having M multiplexed signals and has a multiplex ratio of 1:M.

13. The method of claim 7, wherein the first and second optical splitters each have a demultiplexing ratio of 1:16.

14. The method of claim 7, wherein the arrayed wave grating has a demultiplexing ratio of 1:32.

15. A method of upgrading a time division multiplexing passive optical network to a wavelength division multiplexing passive optical network, the method comprising:
connecting a first optical fiber carrying a first multiplexed optical signal to a combiner at a first time;
connecting a second optical fiber carrying a second multiplexed optical signal to the combiner at a second time different than the first time;
connecting the combiner to a first node input of an optical network node, the first node configured to receive the first or second multiplexed optical signal; and
connecting a third optical fiber carrying a third multiplexed optical signal to a second node input of the optical network node, the optical network node comprising:
node outputs, each outputting a separate replicated or demultiplexed optical signal, the node outputs comprising first and second groups of node outputs;
a first optical power splitter having a first splitter input connected to the first node input and first splitter outputs directly coupled to the first group of node outputs, the first optical power splitter replicating the first multiplexed optical signal, when the first multiplexed optical signal is time division multiplexed;
a second optical power splitter having a second splitter input connected to the second node input and second splitter outputs directly coupled to the second group of node outputs, the second optical power splitter replicating the third multiplexed optical signal, when the third multiplexed optical signal is time division multiplexed; and
an arrayed waveguide grating having a grating input connected to the first node input and grating outputs directly coupled to the first and second groups of node outputs, the arrayed waveguide grating demultiplexing the second multiplexed optical signal, when the second multiplexed optical signal is wavelength division multiplexed.

16. The method of claim 15, wherein the first and second optical power splitters have the same splitting ratio.

17. The method of claim 15, wherein each of the first and second optical power splitters has a splitting ratio equal to half of a demultiplexed ratio of an output of the arrayed waveguide grating.

18. The method of claim 15, wherein the arrayed waveguide grating demultiplexes an optical signal having M multiplexed signals, and the first and second optical power splitters have a splitting ratio of 1:M/2.

19. The method of claim 15, wherein the arrayed waveguide grating demultiplexes an optical signal having M multiplexed signals and has a multiplex ratio of 1:M.

20. The method of claim 15, wherein the first and second optical splitters each have a demultiplexing ratio of 1:16.

21. The method of claim 15, wherein the arrayed wave grating has a demultiplexing ratio of 1:32.

* * * * *